Jan. 18, 1944.          H. T. BATTIN          2,339,611
CONTINUOUS VULCANIZING APPARATUS
Filed Dec. 9, 1942          2 Sheets-Sheet 1
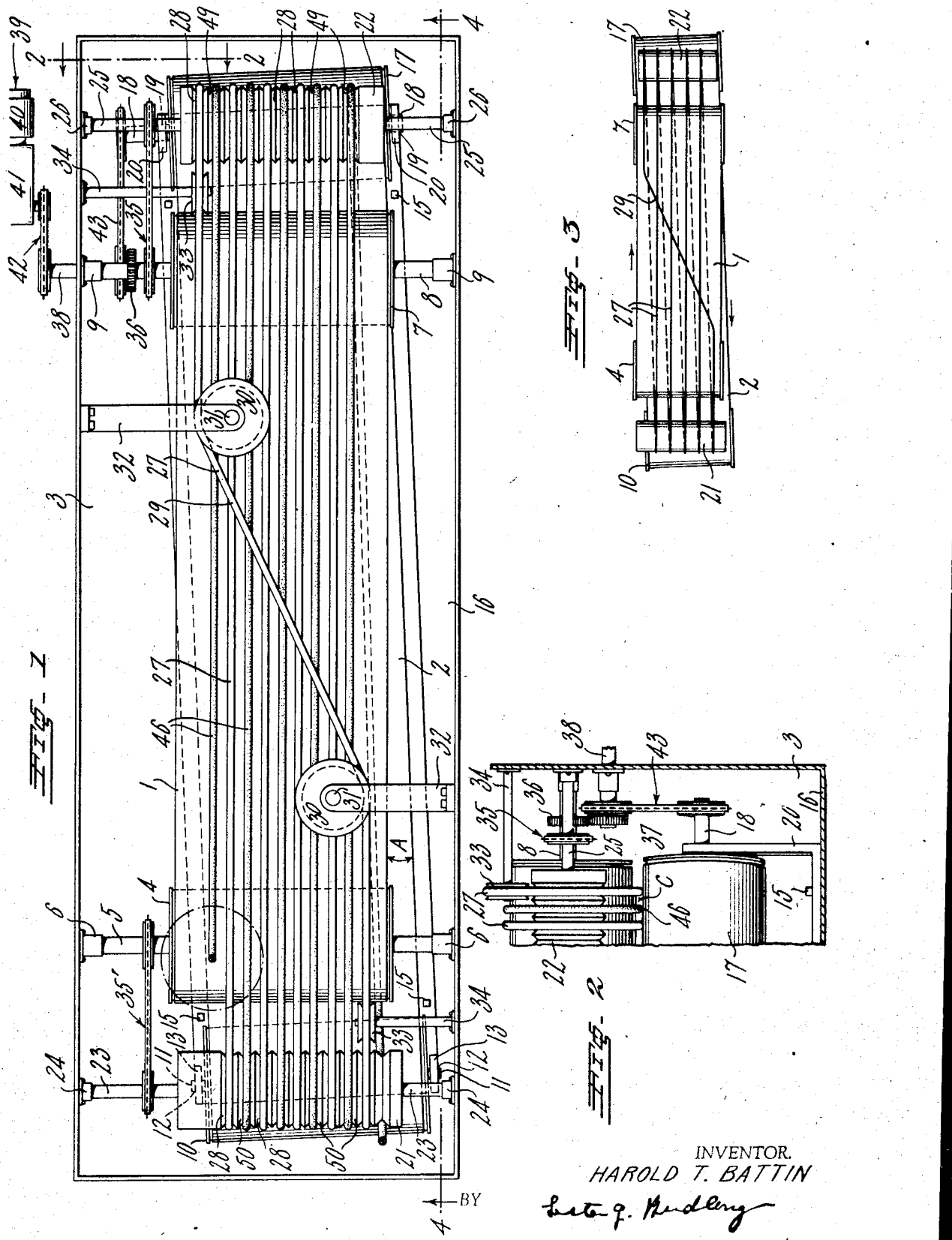
INVENTOR.
HAROLD T. BATTIN
BY
ATTORNEY Jan. 18, 1944.  H. T. BATTIN  2,339,611
CONTINUOUS VULCANIZING APPARATUS
Filed Dec. 9, 1942   2 Sheets-Sheet 2
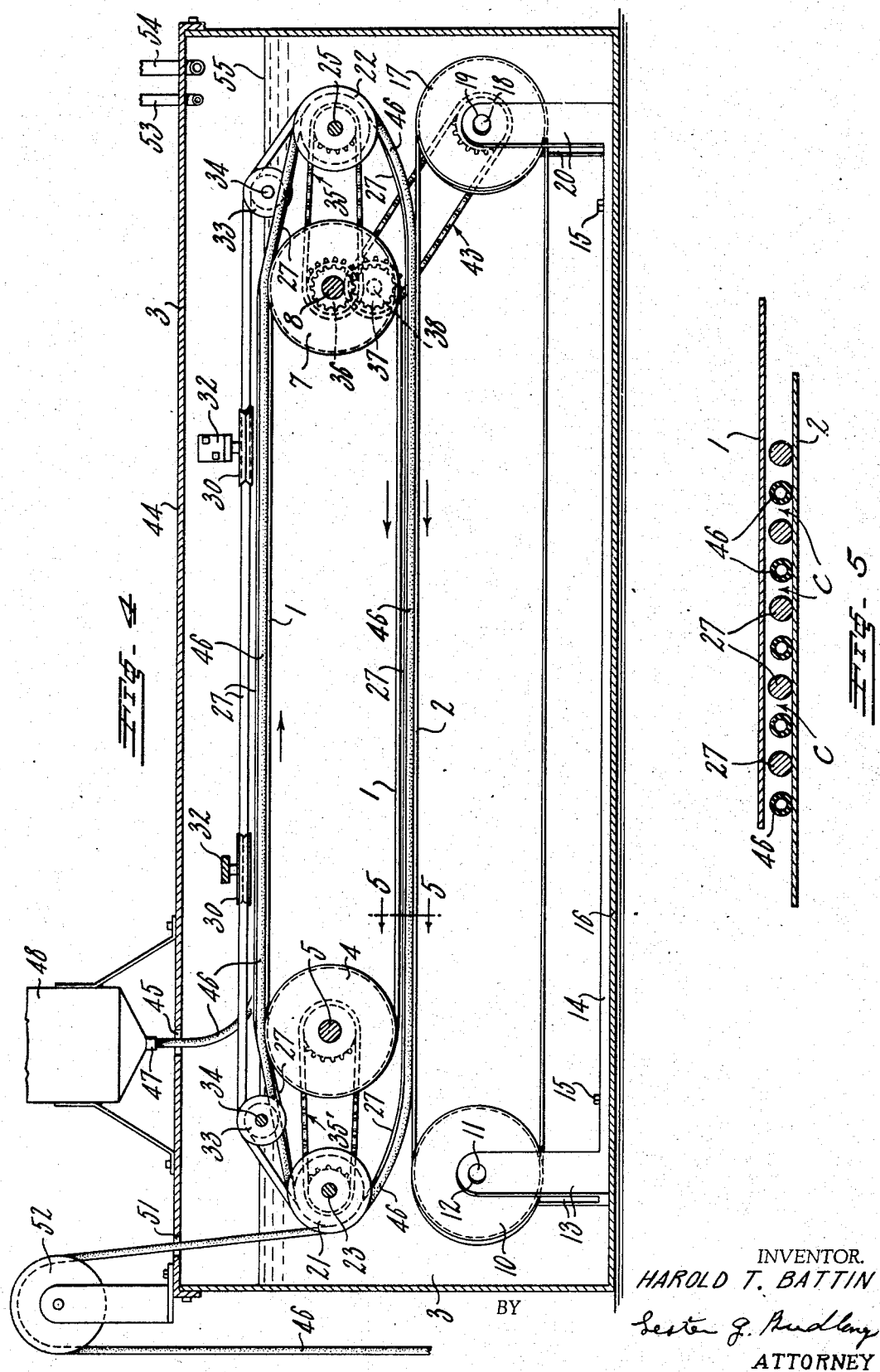
INVENTOR.
HAROLD T. BATTIN
BY Lester J. Rudley
ATTORNEY Patented Jan. 18, 1944

2,339,611

UNITED STATES PATENT OFFICE 2,339,611

CONTINUOUS VULCANIZING APPARATUS

Harold T. Battin, Ridgewood, N. J., assignor to United States Rubber Company, New York, N. Y., a corporation of New Jersey Application December 9, 1942, Serial No. 468,390

11 Claims. (Cl. 18—6)

This invention concerns apparatus for vulcanizing a continuous length of material within the confines of a relatively short compartment through which the material is conveyed in a series of convolutions or turns, and is an improvement on the apparatus disclosed in the patent granted to me on May 14, 1940, No. 2,200,735.

In the patented machine a continuous length of material such as a tube, hose, cord, thread or tape of rubber is conveyed from an extruding nozzle, through a tank or compartment containing a vulcanizing medium, and is thereafter delivered at a point outside of the machine as a vulcanized product. The entire length of material travels through the compartment in a series of convolutions around an endless flat conveyor belt. The product is supported on the top run of that belt, and the top run of another endless conveyor belt arranged below the first for the purpose of causing the product to lie in a straight line while it is being vulcanized. The two endless conveyor belts are driven in opposite directions with a slight angularity between the belts. With this arrangement an extruded length of hose or other product is carried along to the end of the top run of the upper belt where it descends to the top run of the lower belt running in the opposite direction to the top run of the upper belt. Upon reaching the end of the top run of the lower belt the product is returned to the upper belt to make another convolution spaced laterally from the previous convolution. The vulcanized product is finally withdrawn from the compartment after having passed through the required number of convolutions while under the action of the vulcanizing medium, usually steam, heated air, or heated water.

The present invention is described herein as embodied in apparatus of the same general construction as the above.

In the prior apparatus there is only a fluid medium separating the adjacent reaches of the convolutions of the product on the belts, and in the event such laterally spaced reaches of the convolutions should be shifted laterally against one another they might become damaged. To prevent such action it is an object of the present invention to provide positive means for keeping the convolutions apart during the cure, and to accomplish this without subjecting the material to any forces tending to stretch or otherwise cause imperfections in the final product. For this purpose there is provided a continuous partition, preferably in the form of an endless cable or similar element, under the control of means adapted to guide a section of the cable between the convolutions of the product along the supporting surfaces of the upper and lower belts, from one side to the other, the cable being driven to travel along with the belts in slightly spaced relation to the adjacent reaches of the product. The bottom run of the upper belt and the top run of the lower belt are disposed in slightly spaced parallel relation to provide in effect a plurality of moving channels in which individual convolutions of the product are enclosed and confined between the opposed surfaces of the two belts and the side walls formed by the cable. In this manner the product proceeds through the vulcanizing chamber with the interposed cable and closely spaced belts preventing excessive lateral displacement or contact of the several portions of the product, thereby protecting the same from damage and improving the operation of the machine.

Other objects and advantages of the invention will appear as the description proceeds, reference being made to the accompanying drawings illustrating one practical embodiment, and wherein:

Fig. 1 is a plan view of the vulcanizing chamber with the cover removed to show the conveyor belts, driving means, and the continuous partition disposed between the advancing portions of extruded material;

Fig. 2 is a vertical cross-section on the line 2—2 of Fig. 1 at the drive end of the machine;

Fig. 3 is a diagrammatic plan view of the apparatus indicating the arrangement of the continuous partition;

Fig. 4 is a vertical cross-section on the line 4—4 of Fig. 1; and

Fig. 5 is a cross-section on the line 5—5 of Fig. 4.

Referring particularly to Figs. 1 and 4, an upper belt 1 and a lower belt 2 are supported within a vulcanizing tank or chamber 3 and disposed laterally at a slight angle A to each other as viewed in plan. One end of the upper belt 1 is carried on a drum 4 supported by a shaft 5 mounted at opposite ends in bearings 6 secured to the walls of the tank 3. The other end of the belt 1 is similarly carried on a drum 7 supported by a shaft 8 mounted to rotate in bearings 9.

The lower belt 2 is carried at the end adjacent to the upper drum 4 on a similar drum 10 having a shaft 11 mounted in bearings 12 of the vertical standards 13 which are mounted on a base 14 fastened as by bolts 15 to the bottom 16 of the tank 3. The opposite end of the lower belt 2 is supported on a drum 17 fixed to a shaft 18 which rotates in the bearings 19 of the standards 20 likewise mounted on the base 14.

Two multi-grooved pulleys 21 and 22 are mounted in the tank 3, the pulley 21 being located above the lower drum 10 and mounted on a shaft 23 supported in bearings 24. The other pulley 22 is mounted on a shaft 25 carried in bearings 26. A partition element which may be in the form of an endless cable, belt, or rope 27 as illustrated, is disposed in convolutions around the upper belt 1 and engages the alternate grooves 28 of the two pulleys 21 and 22 which direct the cable onto the upper surface of the belt 1 to form a plurality of spaced parallel sections arranged to travel with the belt. The lower sections of the cable 27 likewise guided by the pulleys 21 and 22 are supported in side-by-side relation upon the upper flat surface of the lower belt 2 and constitute spaced parallel partitions lengthwise of that belt. A cross-over section 29 of the cable extends diagonally across the upper belt and between the two idler pulleys 30 which are mounted on the bearings 31 of the brackets 32, whereby the cable travels in a continuous course when motion is imparted thereto by suitable driving means. Idler wheels 33 mounted on bearing members 34 provide additional guides for the upper section of the cable 27 during its travel from the left end of the machine to the driving end thereof.

It will be noted by referring to Figs. 4 and 5 that the surface of the lower run of the belt 1 lies generally in a plane parallel to and spaced only slightly away from the top run of the lower belt 2 and close to but not touching the cable 27. The spacing is such that the lower convolutions of the product 46 are confined in the lengthwise individual channels C (Figs. 2 and 5) formed by the opposed surfaces of the two belts and the side walls formed by the several convolutions of the cable 27. This prevents excessive movement of the product laterally of the belts and also prevents the product from riding over the cable into engagement with adjacent convolutions of the product.

In the present example the drive is effected by providing a chain and sprocket connection 35 between the shafts 8 and 25 which in turn are connected through like gears 36 and 37 to a counter-shaft 38. A power unit comprising a motor 40 and a reduction box 41 may be employed to drive the counter-shaft 38 through the medium of a chain and sprocket connection 42. The shafts 8 and 23 are also tied together by a chain and sprocket connection 35'.

The lower belt 2 is driven by a chain and sprocket connection 43 between the shafts 18 and 38. The gear relationship between the interconnected shafts 8, 25, 38, and 18 is such that the upper and the lower belts 1 and 2 and the cable 27 are all driven at the same lineal speed. The upper run of the belt 1 travels from left to right toward one end of the chamber 3 as viewed in Figs. 1 and 4, while the upper run of the lower belt 2 travels in the opposite direction toward the other end at the same speed by reason of the reversal effected by the two gears 36 and 37.

Preferably a cover 44 is provided enclosing the above described apparatus and having an opening 45 for the passage of a stream of material 46 such as rubber compound extruded from a suitable nozzle 47, the rubber being for example in the form of a tube of circular cross-section. An extruder 48 above the nozzle 47 may be used to provide an appropriate flow of shaped material 46.

In operation the extruded tube 46 falls from the nozzle 47 onto the upper surface of the belt 1 and travels in side-by-side parallel spaced relation with the adjacent section of cable 27 which is also carried on the belt as seen in Fig. 1. Upon reaching the right hand end of the machine the tube 46 is received in a groove 49 of the multi-grooved pulley 22. After making a downward turn with the pulley 22 the tube is delivered to the upper run of the lower belt 2 and proceeds therewith until it reaches the left hand end of the machine where it goes upward and around in the groove 50 of the multi-grooved pulley 21. From that point the tube returns to the upper surface of the belt 1 and again travels therewith to the right hand end of the machine in the same way. This procedure is repeated several times around the vulcanizing chamber with the tube 46 confined in the spaces 5 and guided by the series of grooves 49 and 50 in the respective pulleys 21 and 22 until the tube finally reaches the last groove of the pulley 21 whereupon it rises upward and out of the chamber through the opening 51 in the cover 44. From there it goes over a grooved guide wheel 52 to any desired place outside of the machine either for winding upon a reel or for cutting into lengths. Under normal conditions the cable 27 does not contact the product but merely travels therewith in spaced relation ready to act as a bar against excessive sidewise displacement of the product.

During travel of the tube in its circuitous path through the enclosing chamber it is subjected to vulcanizing heat by any desirable agency such as steam, heated air, hot water, or combinations thereof as may be found most suitable for the work. Steam and hot water or other media may be admitted at one end of the machine respectively through the pipes 53 and 54. The cover 44 substantially confines the heat arising from the vulcanizing medium. This is particularly desirable when the product being treated is of light construction tending to float in the curing liquid and the liquid must be kept at a level which will prevent the product from floating off of the supporting surface of the upper belt. In such cases the heat or steam above the liquid is of assistance in effecting the cure. The liquid level indicated by the numeral 55 in Fig. 4 has been found suitable for certain types of light material such as tubing and cords of low density. For heavier materials the liquid level may be higher if desired.

The foregoing arrangement of continuous partitions interposed alternately between the product which is being carried along on the two traveling belts 1 and 2 is of especial importance when the curing medium is boiling, since it prevents the various convolutions of the product from moving excessively out of line and becoming entangled or damaged against adjacent portions. The product therefore emerges from the vulcanizing chamber in good order, and production is speeded by reason of the improved operation of the machine.

It is to be understood that although the present improvement has been described with reference to specific details of construction and particularly in its application to the type of apparatus disclosed in my patent above referred to, the invention may be used in any situation where it may be desirable, and embodied in numerous other modifications and constructions within the scope of the appended claims. One of such modifications may consist in employing another belt above the upper belt 1 and spaced similarly to the opposing runs of the two belts already described. In this manner another series of lengthwise channels would be provided along the top run of the belt 1 for the upper convolutions of the product 46, and thereby prevent the product from floating across the cable 27. In making this alteration the portion of the cable 27 extending between the idler wheels 33 may be elevated to provide space for the third belt.

Having thus described my invention, what I claim and desire to protect by Letters Patent is:

1. In a vulcanizing apparatus, the combination of a vulcanizing chamber, means for forming a vulcanizable product in a continuous length, an upper conveyor belt and a lower conveyor belt in said chamber and adapted to support said product, means for moving the top runs of the upper and lower belts respectively toward opposite ends of the chamber, means for guiding said product in a series of convolutions in said chamber and onto said top runs of the belts, the upper belt being disposed laterally at an angle to the lower belt, said guiding means cooperating with said belts to dispose said convolutions in spaced parallel relation, and partition means positioned between the spaced convolutions.

2. In a vulcanizing apparatus, the combination of a vulcanizing chamber, means for forming a vulcanizable product in a continuous length, an upper conveyor belt and a lower conveyor belt in said chamber and adapted to support said product, means for moving the top runs of the upper and lower belts, respectively, toward opposite ends of the chamber, means for guiding said product in a series of convolutions in said chamber and onto said top runs of the belts, the upper belt being disposed laterally at an angle to the lower belt, said guiding means cooperating with said belts to dispose said convolutions in spaced parallel relation, and moving partitions interposed between the spaced convolutions of said product, the surface of the bottom run of the upper belt lying generally in a plane parallel to the top run of the lower belt and forming with said partitions a plurality of spaced channels adapted to confine individual convolutions of said product.

3. In a vulcanizing apparatus, the combination of a vulcanizing chamber, means for forming a vulcanizable product in a continuous length, an upper conveyor belt and a lower conveyor belt in said chamber and adapted to support said product, means for moving the top runs of the upper and lower belts, respectively, toward opposite ends of the chamber, means for guiding said product in a series of convolutions in said chamber and onto said top runs of the belts, the upper belt being disposed laterally at an angle to the lower belt, said guiding means cooperating with said belts to dispose said convolutions in spaced parallel relation, and an endless partition moving with and interposed between the spaced convolutions of said product.

4. In a vulcanizing apparatus, the combination of a vulcanizing chamber, means for forming a vulcanizable product in a continuous length, an upper conveyor belt and a lower conveyor belt in said chamber and adapted to support said product, means for moving the top runs of the upper and lower belts respectively toward opposite ends of the chamber, means for guiding said product in a series of convolutions in said chamber and onto said top runs of the belts, the upper belt being disposed laterally at an angle to the lower belt, said guiding means cooperating with said belts to dispose said convolutions in spaced parallel relation, an endless cable, means for guiding said cable into interposed position between the spaced convolution of said product, and means for driving the cable to travel with the product.

5. In a vulcanizing apparatus, the combination of a vulcanizing chamber, means for forming a vulcanizable product in a continuous length, an upper conveyor belt and a lower conveyor belt in said chamber and adapted to support said product, means for moving the top runs of the upper and lower belts respectively toward opposite ends of the chamber, means for guiding said product in a series of convolutions in said chamber and onto said top runs of the belts, the upper belt being disposed laterally at an angle to the lower belt, said guiding means cooperating with said belts to dispose said convolutions in spaced parallel relation, an endless cable, means at opposite ends of the belts for guiding the cable in position between the spaced convolutions of said product, and means for driving the cable to travel at the same speed as the belts.

6. In a vulcanizing apparatus, the combination of a vulcanizing chamber, means for forming a vulcanizable product in a continuous length, an upper conveyor belt and a lower conveyor belt in said chamber and adapted to support said product, means for moving the top runs of the upper and lower belts respectively toward opposite ends of the chamber, means for guiding said product in a series of convolutions in said chamber and onto said top runs of the belts, the upper belt being disposed laterally at an angle to the lower belt, said guiding means cooperating with said belts to dispose said convolutions in spaced parallel relation, an endless cable disposed in a series of convolutions in said chamber around the upper belt and interposed in spaced parallel relation between the convolutions of said product on both belts, and means for driving the cable to travel at the same speed as the belts, the surface of the bottom run of the upper belt lying generally in a plane parallel to the top run of the lower belt and defining with the lower convolutions of said cable a plurality of lengthwise channels, each confining an individual convolution of said product.

7. In a vulcanizing apparatus, the combination of a vulcanizing chamber, means for forming a vulcanizable product in a continuous length, an upper conveyor belt and a lower conveyor belt in said chamber and adapted to support said product, means for moving the top runs of the upper and lower belts respectively toward opposite ends of the chamber, means for guiding said product in a series of convolutions in said chamber and onto said top runs of the belts, the upper belt being disposed laterally at an angle to the lower belt, said guiding means cooperating with said belts to dispose said convolutions in spaced parallel relation, said guiding means comprising a multigrooved pulley at each end of the upper belt, the product being guided in alternate grooves of the pulley, an endless cable disposed in said chamber in a series of convolutions around the upper belt and guided by the grooves intermediate said alternate grooves to provide an endless partition between the convolutions of said product, and means for rotating said pulleys in unison with the movement of the belts.

8. In a vulcanizing apparatus, the combination of a vulcanizing chamber, means for forming and introducing a vulcanizable product into said chamber in a continuous length, an upper conveyor belt and a lower conveyor belt adapted to support said product, said belts being located one above the other in said chamber and disposed laterally at an angle to each other, a multi-grooved pulley at each end of the upper belt for guiding the product in alternate grooves of the pulleys in spaced convolutions around the upper belt, an endless cable disposed in said chamber in a series of convolutions around the upper belt and guided by the grooves intermediate said alternate grooves to provide an endless partition between the convolutions of said product, a driving connection between each pulley and the upper belt, and a driving connection between the two belts adapted to move the conveying portions thereof respectively toward opposite ends of the chamber.

9. In apparatus for vulcanizing a product in a continuous length, the combination of means for conveying the product through a vulcanizing tank in a series of spaced side-by-side convolutions, an endless partition positioned between the convolutions, and means for moving said partition with said convolutions and in spaced parallel relation thereto.

10. In a vulcanizing apparatus, the combination of conveyor belts positioned one above another and having opposed runs whose surfaces lie in spaced parallel relation, and an endless cable forming partitions adapted to move with said belts between their opposed runs, said cable and the opposed runs of the belts forming spaced enclosing channels adapted to confine material to be vulcanized.

11. In a vulcanizing apparatus, the combination of conveyor belts positioned one above another, and means for guiding a series of partitions in spaced parallel relation along said belts to provide individual channels for material to be vulcanized.

HAROLD T. BATTIN.